United States Patent [19]
Fisch

[11] Patent Number: 5,961,331
[45] Date of Patent: Oct. 5, 1999

[54] AIR TRAFFIC VOICE INTERACTIVE SIMULATOR

[75] Inventor: Gregory Fisch, Downey, Calif.

[73] Assignee: Fusionworks, Inc., Santa Fe Springs, Calif.

[21] Appl. No.: 09/259,831

[22] Filed: Mar. 1, 1999

[51] Int. Cl.[6] .................................................. G09B 19/14
[52] U.S. Cl. ........................................... 434/220; 434/219
[58] Field of Search .......................... 434/29, 30, 219, 434/220, 55, 59; 379/88, 92; 342/36; 395/500.27, 500.29

[56] References Cited

U.S. PATENT DOCUMENTS

| | | | |
|---|---|---|---|
| Re. 34,587 | 4/1994 | Crane et al. ............................... | 379/88 |
| 4,516,125 | 5/1985 | Schwab et al. ........................... | 342/36 |
| 4,751,662 | 6/1988 | Crosbie .................................... | 434/59 |
| 4,979,137 | 12/1990 | Gerstenfeld et al. .................. | 395/500.27 |
| 5,200,901 | 4/1993 | Gerstenfeld et al. .................. | 395/500.27 |
| 5,607,306 | 3/1997 | Bothwell .................................. | 434/29 |

*Primary Examiner*—Sam Rimell
*Attorney, Agent, or Firm*—Drummond & Duckworth

[57] ABSTRACT

A computerized air traffic voice interactive simulator is provided for simulating the communications between a pilot and an air traffic controller. The air traffic voice interactive simulator includes an audio input means, central processing unit and audio input means. The central processing unit interprets and evaluates verbal responses received from a user through the audio input means for selecting an appropriate audio message for production on the audio output means. The audio messages are selected to provide feedback and interactive communication with a user so as to simulate dialog between a pilot and air traffic controller.

6 Claims, 6 Drawing Sheets

AIR TRAFFIC VOICE INTERACTIVE SIMULATOR

BACKGROUND OF THE INVENTION

The present invention relates generally to apparatus and methods for simulating aircraft flight.

More specifically, the present invention relates to a voice interactive simulator for simulating air traffic audio communications.

Anecdotally, flying in a commercial aircraft is said to be safer than driving an automobile. However, where accidents do occur, large numbers of individuals often lose their lives or suffer severe injuries. Moreover, even where injuries have not occurred, accidents involving commercial aircraft typically result in substantial damage to the aircraft and a substantial corresponding monetary losses.

Moreover, alarming statistics are available relating to the number of aircraft accidents involving private pilots. In general, private pilots do not possess the training and experience possessed by commercial pilots. Furthermore, planes owned privately typically do not include the safety equipment carried by commercial aircraft and are typically not inspected or maintained to the requirements of commercial aircraft. As a result, flying in a private plane is statistically far more dangerous than flying in a commercial aircraft.

To reduce the aforementioned dangers, aircraft pilots and trainees must conduct substantial study and training in the fields of aeronautics and avionics. In addition, pilots and trainees conduct substantial training in an actual working environment. For example, commercial pilots must typically finish several hundred hours or more of flight time before they can be licensed to fly an aircraft. Unfortunately, in many situations it is either impractical or impossible to provide training in an actual aircraft. For example, the training of new pilots and the continued training of more experienced pilots cannot often be practically or economically accomplished with the aircraft itself.

It is for these reasons, that flight simulators have been developed. Typical flight simulator systems are disclosed in U.S. Pat. No. 5,607,306 issued to Bothwell, U.S. Pat. No. 3,924,342 issued to Pedlar et al., U.S. Pat. No. 4,568,286 issued to Acklam and U.S. Pat. No. 4,751,662 issued to Crosbie. Such flight simulator systems are ideally constructed as exact replicas of the actual working environment and provide audio/visual experiences simulating actual flight. These simulator systems typically include switches, buttons, gages, meters and other controls for simulating the actual controls used in the working environment of an aircraft. The simulator systems also typically include a visual display for displaying the simulated ground terrain, the horizon and the sky as seen from an actual aircraft. In operation, the training systems simulate the actual conditions in response to the trainee's or pilot's use of the simulator controls. In this way, pilots and trainees can gain valuable experience in flying without the costs associated with actually flying an aircraft.

Unfortunately, such systems do not provide training to pilots and trainees on how to communicate with air traffic controllers. Air traffic controllers are provided with air traffic controller procedure manuals including several hundred pages of detailed instructions on when and how to communicate with pilots. Radio communication protocol between pilots and air traffic controllers is indeed very complicated, which presently must largely be learned by pilots through trial and error. As a result, pilots can become overwhelmed with the amount of information given to them by air traffic controllers. For example, a pilot given the heading, "right 350, climb and maintain 2,500" may be misconstrued as "right 250, climb and maintain 3,500". Though the instructions generally given to the pilot are required to be read back to the air traffic controller, this swapping of numbers can sometime go unnoticed causing very dangerous situations. In addition, confusion between pilots and air traffic controllers can often be exacerbated when the individuals involved come from different regions and have different accents.

Unfortunately, the lack of training by pilots in air traffic controller protocol has resulted in the past in aircraft accidents involving injury and death. For example, on Nov. 19, 1996, an aircraft accident occurred in Quincy, Ill. as a result of miscommunications by a pilot during takeoff. The failure of a pilot to announce his intention to take off created a collision between two airplanes resulting in 14 fatalities. In addition, on Oct. 21, 1997, at West Palm Beach, Fla., a pilot mistakenly landed on runway 27R, when in fact he had been cleared for 27L. This mistake resulted in the aircraft encountering wake turbulence and the aircraft's collision with the ground. This crash resulted in two serious injuries.

Accordingly, there is a considerable need for the training of aircraft pilots and trainees in the use of air traffic controller protocol. More particularly, there is a need for an interactive voice simulator for training aircraft pilots and trainees in the required terminology, procedures and customs of the communications between pilots and air traffic controllers. Unfortunately, such systems are not now provided to trainees or pilots. In contrast, aircraft simulators such as described in U.S. Pat. No. 4,281,994 issued to Dell et al. disclose the audio output of prerecorded messages to a simulator user. However, such systems are incapable of interacting with the trainee's vocal commands or instructions, or correcting the trainee where his commands or instructions are in error. Moreover, there is no disclosure that voice interactive systems such as disclosed in U.S. Pat. No. 5,191,617 issued to Bolin et al. or U.S. Pat. No. Re. 34,587 issued to Crane et al. are capable of being adapted for use with a flight simulator. Accordingly, a need has arisen for an apparatus for providing aircraft pilots and trainees with air traffic voice interactive simulation, and for methods of training aircraft pilots and trainees in air traffic controller protocol to reduce the dangers of aircraft flight.

SUMMARY OF THE INVENTION

The present invention addresses the aforementioned needs by providing an air traffic voice interactive simulator for training pilots and trainees to verbally interact with air traffic controllers. The term "air traffic controllers" is defined herein in its broadest sense to include air traffic controller located on the ground or in the air, such as located in AWAC military aircraft. In addition, the term "air traffic controllers" is intended to include other pilots who must sometimes communicate like typical air traffic controllers. For example, at "towerless" airports pilots must perform the function of air traffic controllers providing traffic advisory information to other pilots.

The air traffic voice interactive simulator of the present invention includes a computer central processing unit. Operationally connected to the central processing unit are an audio input means for receiving audio responses of the simulator's user and an audio output means for producing audio messages to the user selected to simulate air traffic communications. Also connected to the central processing unit is a memory storage means for storing audio training exercises. The audio training exercises include a plurality of audio messages constructed to provide information or to illicit a verbal response from a pilot or trainee.

Preferably, the air traffic voice interactive simulator of the present invention consists of a particularly adapted IBM compatible or Apple personal computer of the type which are ubiquitous in society today. To this end, the computer system includes a microphone and voice card connected to the central processing unit for receiving and digitizing the verbal responses of a user. In addition, the computer system includes one or more speakers and a sound card connected to the central processing unit for converting digitized audio messages to an analog format for audibly producing audio messages to the pilot or trainee. Preferably, the microphone and speaker are characterized by a headset which frees the hands of the user of the air traffic voice interactive simulator of the present invention.

In addition, preferably the computer's memory storage means consists of both random access memory (RAM) and compact disk read only memory (CD-ROM) of the kind well known to those in the art. CD-ROM memory is preferred because of its light weight mobile construction and because of the large amount of memory storage available thereon. However, any other type of memory storage means for storing the audio exercises and audio messages, such as magnetic tape, read only memory (ROM) chips or a hard disk drive, may be used without departing from the scope of the present invention.

The air traffic voice interactive simulator may also include a video display and keyboard connected to the central processing unit. The video display may be a cathode ray tube (CRT), liquid crystal display (LCD), light emitting diodes (LED) or field emission display (FED) and is not intended to be a limiting feature of the invention.

In operation, the central processing unit initiates an audio training exercise at the request of the user, such as a pilot or trainee. During the audio training exercise, verbal responses from the user are received by the audio input means. These audio responses are then converted from analog to digital by an analog to digital convertor, such as by a voice card connected to the central processing unit, and sent to the central processing unit for processing. The central processing unit then interprets and evaluates the user's digitized verbal response and selects an appropriate audio message from the memory storage means. The audio messages are then sent by the central processing unit to a digital to analog convertor, such as a computer sound card, for audio production on the system's audio output means.

The audio messages are constructed to provide instructions and/or questions to prompt verbal responses from a pilot or trainee to simulate dialog between a pilot and an air traffic controller. Moreover, in contrast to prior art flight simulators which merely produce the simulated audio of an air traffic controller, the audio training exercises of the present invention provide predefined "conversations" where the computer takes the role of an air traffic controller and the simulator user takes the role of a pilot. The system recognizes and evaluates acceptable, and unacceptable, protocol, phraseology and pronunciation and provides appropriate audio messages accordingly. Utilizing a large "library" of audio training exercises including a large number of audio messages, a user is able to develop his capabilities to communicate with actual air traffic controllers in a wide variety of situations. As the user becomes more proficient with each audio training exercise, preferably the speed, complexity and background clutter of the audio messages will increase so as to simulate communication with air traffic controllers under more difficult circumstances and at larger airports. Moreover, preferably a simulator video display is provided to display information simulating the visual appearance of an airplane takeoff, flight and landing, such as ground terrain, the horizon and the sky to provide the user with complete aircraft flight simulation.

It is thus an object of the present invention to provide an air traffic voice interactive simulator for training pilots and trainees in air traffic controller protocol.

Furthermore, it is an object of the present invention to provide a complete aircraft simulation including visual display and audio simulation to simulate dialog between a pilot and an air traffic controller.

It is an additional object of the present invention to provide methods of training pilots and trainees utilizing the air traffic voice interactive simulator to reduce the dangers of actual aircraft flight.

Other features and advantages of the present invention will be appreciated by those skilled in the art upon reading the following detailed description with reference to the attached drawings.

DETAILED DESCRIPTION OF THE INVENTION

Figure 1:
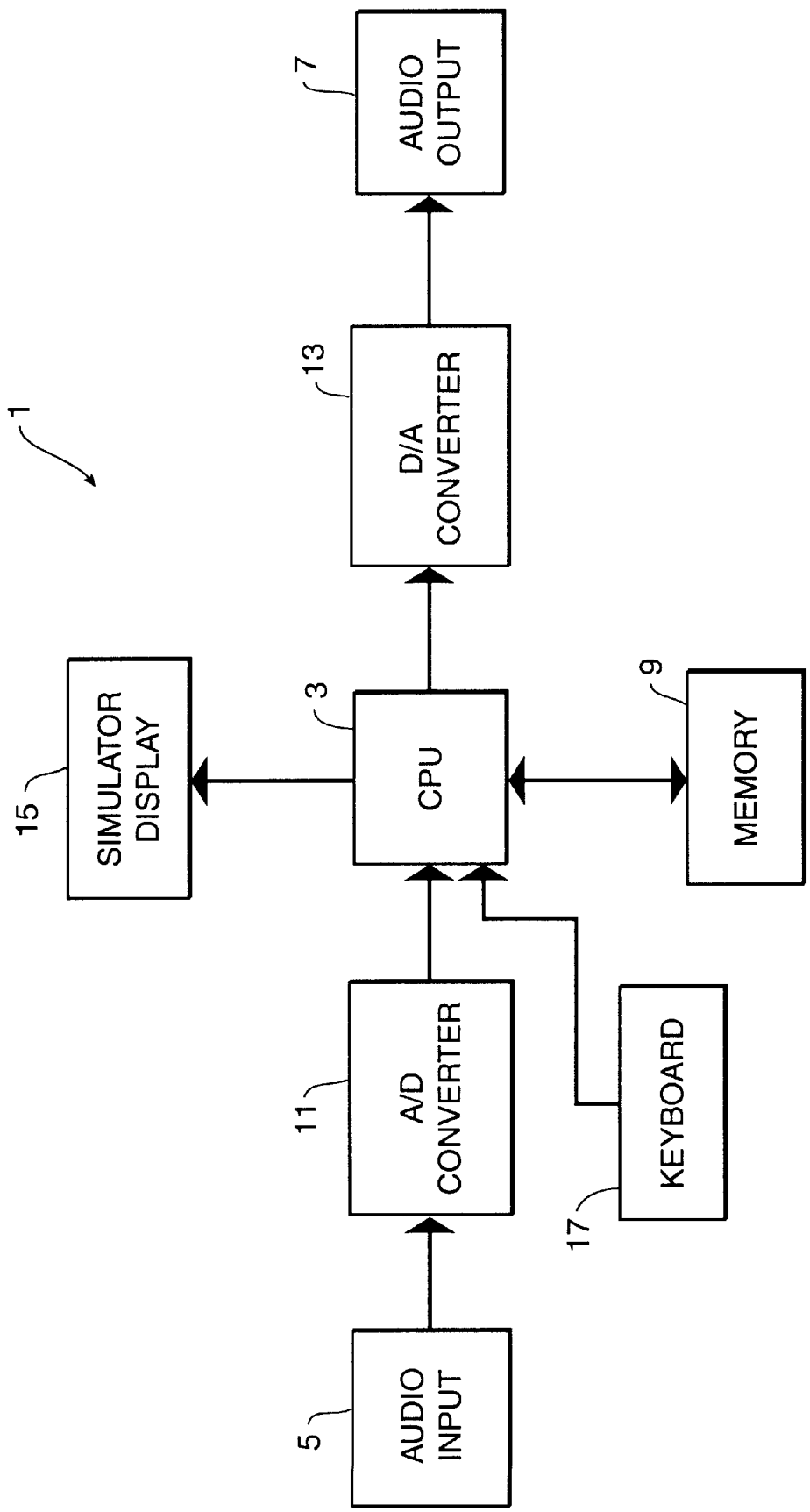
FIG. 1 shows a schematic of the air traffic voice interactive simulator of the present invention.

While the present invention is susceptible of embodiment in various forms, there is shown in the drawings and will hereinafter be described the presently preferred embodiments of the invention with the understanding that the present disclosure is to be considered as an exemplification of the invention and is not intended to limit the invention to the specific embodiments illustrated.

The present invention provides for an air traffic voice interactive simulator for simulating the dialog and verbal communications which occurs between aircraft pilots and air traffic controllers during clearance delivery, ground control, approach and departure, flight watch, etc. Referring to FIG. 1, the air traffic voice interactive simulator 1 of the present invention comprises a computer system 19 including a computer central processing unit 3, an audio input means 5, an audio output means 7 and memory storage means 9. The audio input means 5 is connected to the central processing unit 3 by an analog to digital convertor 11 for converting verbal responses received by the audio input means 5 to a digitized format for use by the central processing unit 3. Similarly, the audio output means 7 is connected to the central processing unit 3 by a digital to analog convertor 13 for converting digitized audio messages received from the memory storage means 9 to an analog format for production on the audio output means 7.

Figure 2:
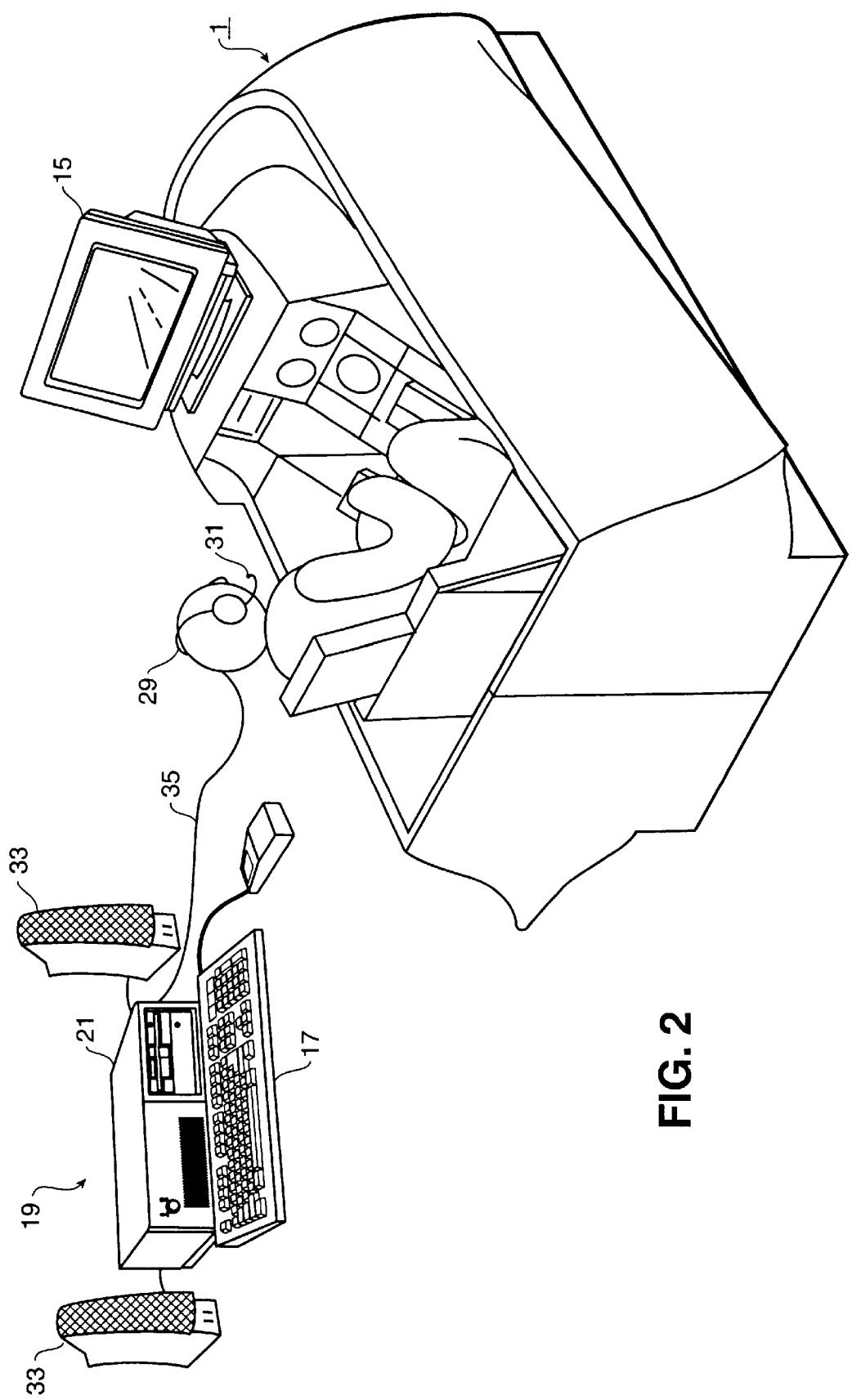
FIG. 2 illustrates a preferred embodiment of the air traffic voice interactive simulator of the present invention.

With reference also to FIG. 2, though not necessary for the practice of the present invention, preferably the air traffic voice interactive simulator 1 is constructed to closely resemble the cockpit of an actual aircraft, including the switches, buttons, gauges, control actuators, etc., typical of an aircraft. In addition, with reference to FIGS. 1 and 2, preferably, the air traffic voice interactive simulator 1 includes a personal computer system of the kind generally known in the art such as an IBM compatible or Apple computer, although the invention may be adapted to virtually any kind of computer system and is not intended to be limited to a particular make or model. The computer system includes a traditional module 21 for housing the central processing unit 3 and memory storage means 9. Preferably, the memory storage means 9 includes random access memory (RAM) and read only memory (ROM), such as compact disk read only memory (CD-ROM), though other types of memory such as magnetic tape, hard disk drives or memory chips are also acceptable.

The memory storage means 9 stores software programming instructions, including one or more audio training exercises and digitized voice vocabulary forming audio messages. Preferably, audio training exercises and audio messages are stored in CD-ROM memory until retrieved by the central processing unit 3. The audio training exercises 41 are lessons designed to train pilots and trainees to verbally interact with air traffic controllers. The lessons are directed to different tasks typically required of pilots when communicating with air traffic controllers. Such tasks generally include communications required for clearance delivery, ground control, tower, approach and departure control, flight service stations, flight watch, UNICOM, etc. Each of these audio exercises incorporate a plurality of audio messages, in the form of instructions and questions, intended to prompt verbal responses from a user of the air traffic voice interactive simulator 1 of the present invention.

Also connected to the central processing unit 3 are a video display 15 and keyboard 17. The video display 15 includes means for displaying an image such as a cathode ray tube (CRT), liquid crystal display (LCD), light emitting diodes (LED) or field emission display (FED). Preferably, the video display 15 has high resolution color capabilities for displaying video graphics, also stored in the memory storage means 9, which simulates the visual impression of airplane flight.

Again with reference to FIGS. 1 and 2, the audio input means 5 and audio output means 7 is provided in the form of a microphone 31 and speaker 33, respectfully. Preferably, the microphone 31 and speaker 33 are in the form of a headset 29 connected directly to module 21 by a headset cable 35.

The computer system 19 further includes an input/output bus (IO bus) (not shown) including a plurality of computer card slots. The computer card slots are adapted for receiving various computer cards. Positioned in a first computer card slot is an analog to digital convertor 11 in the form of a voice card for converting analog speech received from microphone 31 into a digitized voice format. The computer system 19 further includes a digital to analog convertor 13 in the form of a sound card also positioned in one of the computer card slots. The sound card receives digitized audio messages from the memory storage means and converts those messages into an analog format for production on the speaker 33 defining the audio output means 7.

The central processing unit 3, operating in accord with software stored in the memory storage means 9, includes voice interpretation means for interpreting verbal responses received by the audio input means 5. Preferably, the voice interpretation means comprises voice recognition or interactive voice software well known in the art. More particularly, the voice interpretation means includes software located in the system's memory storage means 9 for interpreting the digitized verbal responses received by the audio input means 5 and converted by the analog to digital convertor 11. The central processing unit 3, also operating in accord with software stored in the memory storage means 9, evaluates the interpreted verbal responses received by the audio input means 5 and selects an audio messages stored in the memory storage means 9 for simulating instructions and/or questions from an air traffic controller. This audio message is then produced on the output means 7.

With reference to FIGS. 2 and 3, in operation, a user, such as a pilot or trainee, initiates the air traffic voice interactive simulator 1 by initializing the software 37 in the computer system 19, such as by loading the software 37 into computer RAM. The program and simulation is then commenced such as by the pilot initiating a conversation 39 through microphone 31 with a simulated air traffic controller. At this point, either the user selects an audio training exercise 41 or the computer system 19 chooses an audio training exercise 41 automatically. Each of the audio training exercises 41 are directed to different lessons for training a pilot or trainee in different aspects of communicating with air traffic controllers such as clearance delivery, ground control, tower, departure control, landing, etc. As shown in FIGS. 3A–D, each of the audio training exercises 41*a*–*d* include a plurality of audio messages 43 which are constructed to provide the simulator user with instructions and questions simulating the responses of a typical air traffic controller. These audio messages 43 are constructed to prompt verbal responses 45 from the simulator user with the combination of the audio messages 43 and verbal responses 45 simulating dialogue between a pilot and an air traffic controller.

These verbal responses 45 of the user are received by the computer system headset 29, converted into a digitized format by the computer system voice card and received by the computer system's central processing unit 3. The central processing unit 3 then interprets and evaluated the user's verbal responses 45 to determine an appropriate audio message 43 to be provided to the user. The central processing unit 3 selects from a plurality of different audio messages 43 with the selected audio message 43 intending to most closely simulate a response by an air traffic controller. More particularly, the central processing unit 3 evaluates the verbal responses 45 of a user to determine whether these responses are correct or within a given range of acceptable phraseology and pronunciation. If the central processing unit 3 determines that the verbal response 45 is acceptable, the "conversation" is continued. Where the central processing unit 3 evaluates the user's verbal response 45 and finds the response unacceptable, the central processing unit 3 sends an audio message 43 requesting that the pilot restate his response, provides the user with additional information, or "loops" back to an earlier provided audio message, making the user proceed through that portion of the exercise again. Preferably, the central processing unit 3 also evaluates the user's past experience, training, etc. in selecting the audio message 43 to be provided to the user.

In this manner, the air traffic voice interactive simulator 1 of the present invention provides the user with a variety of "conversations" where the computer system 19 takes the role of the air traffic controller and the user takes the role of a pilot. As the user becomes more proficient with each audio training exercise 41, the speed, complexity, variety of audio messages are intensified and the background clutter is increased. Using a large library of audio messages 43, the user is able to develop his or her capabilities in communicating in a wide variety of situations. This experience reduces the pilot's stress during actual aircraft flight by providing the pilot with experience in communicating with an air traffic controller, thus improving the safety and environment of aircraft flight.

The following examples are presented to further illustrate principles of the invention to those skilled in the art. These examples do not, however, constitute limitations on the scope of the invention.

Example I—Conversation With Tower

Figure 3A:
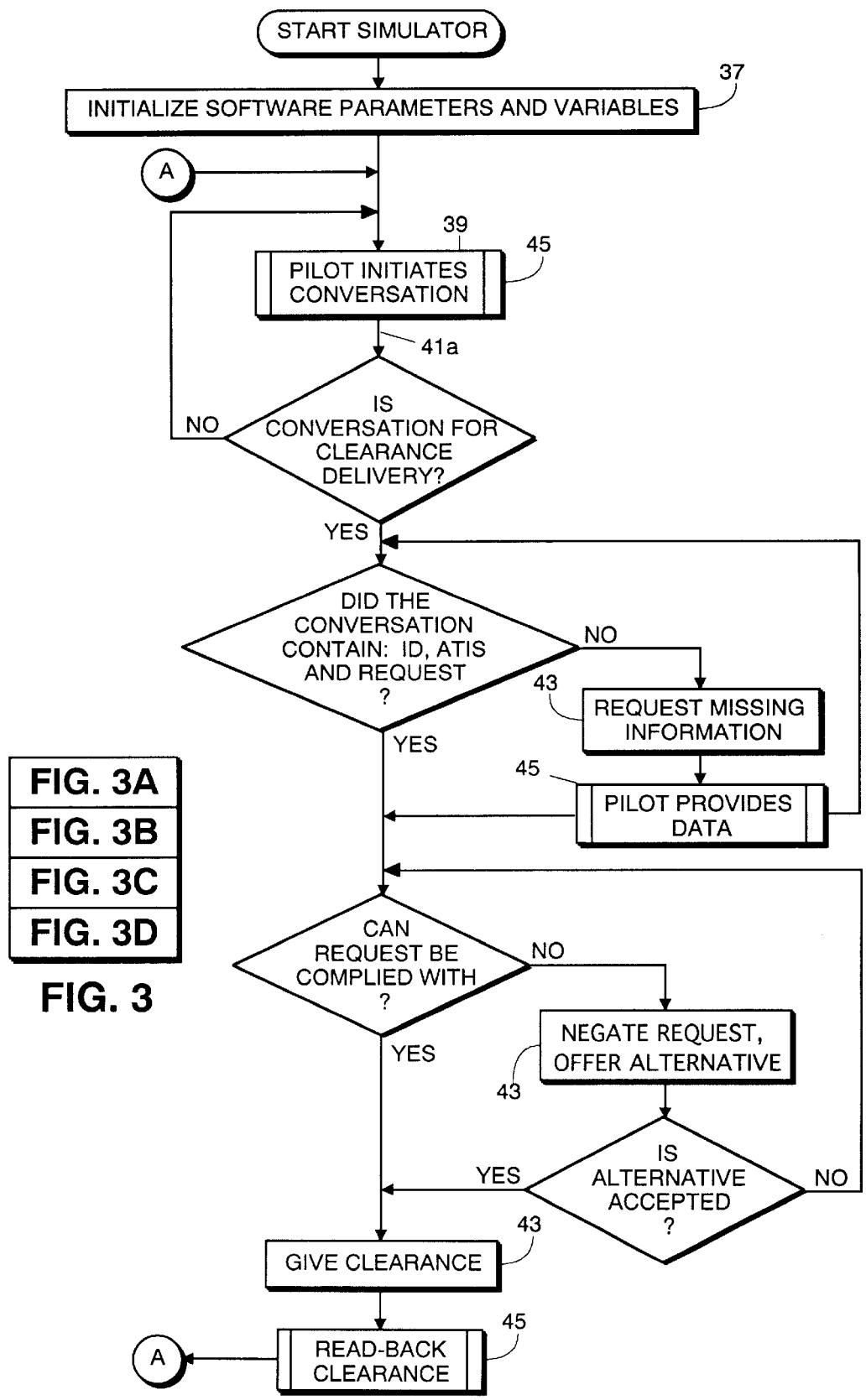
FIG. 3A is a flow chart illustrating an audio training exercise of the air traffic voice interactive simulator of the present invention directed to clearance delivery.
Figure 3B:
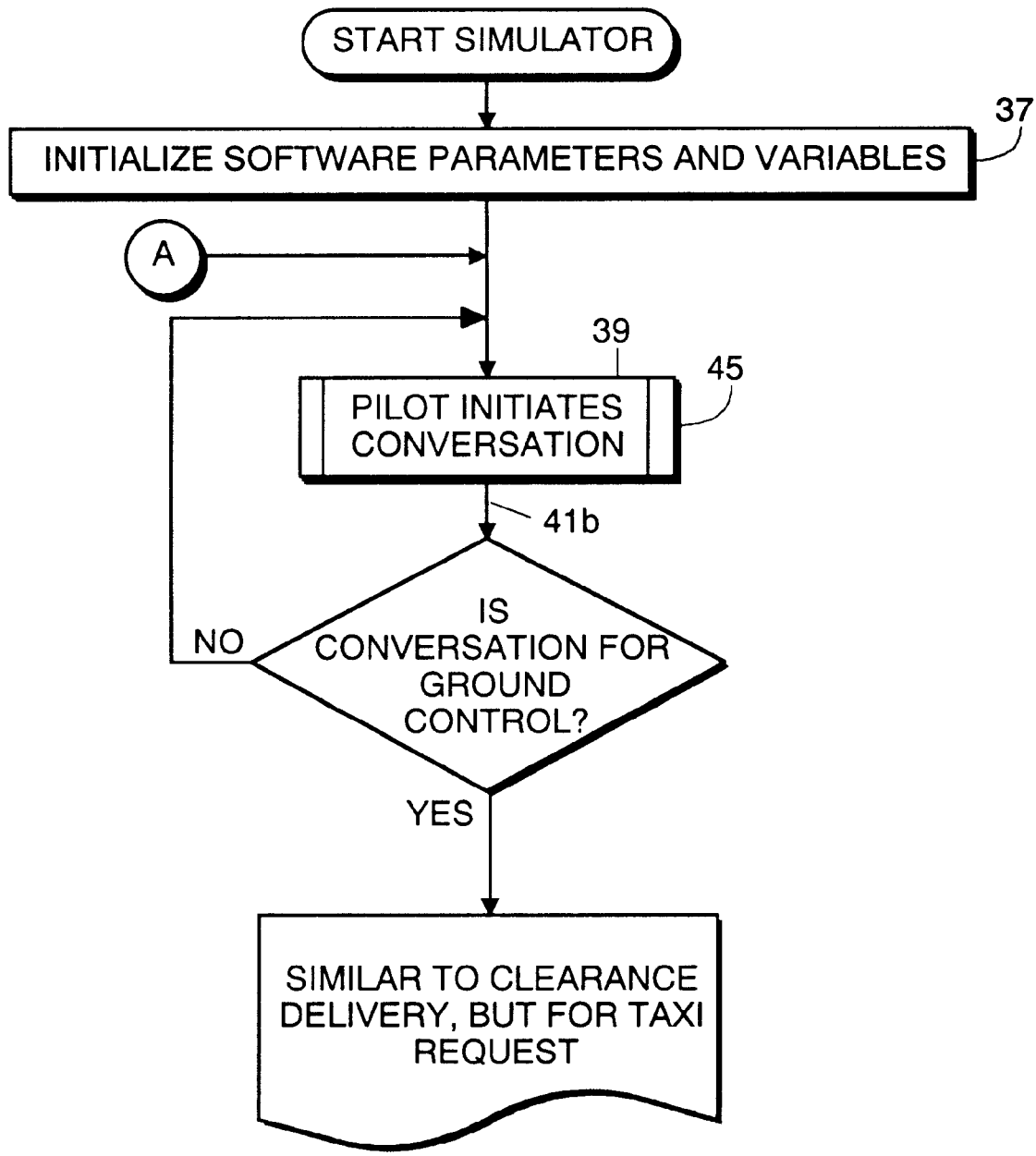
FIG. 3B is a flow chart illustrating an audio training exercise of the air traffic voice interactive simulator of the present invention directed to ground control.
Figure 3C:
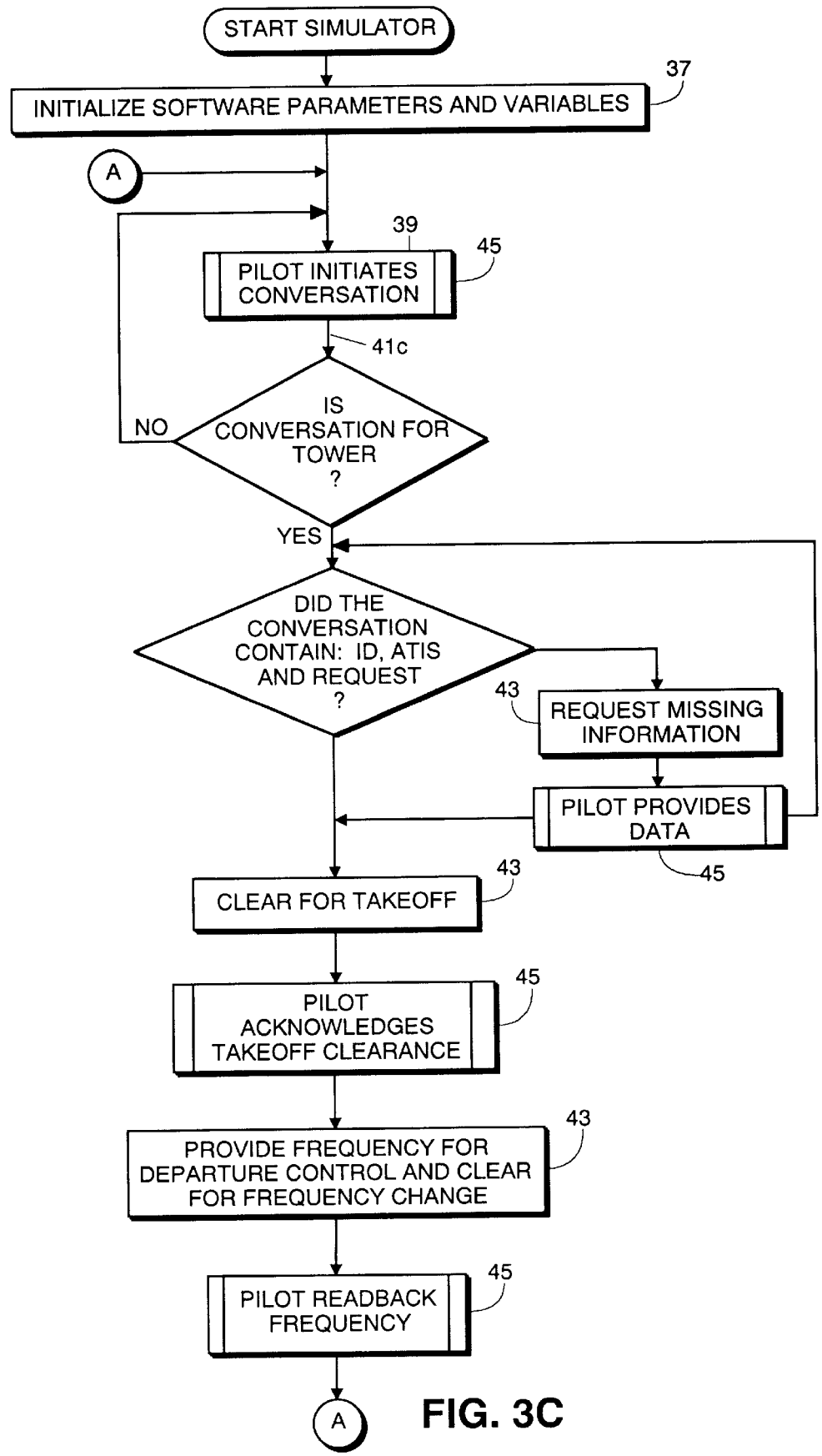
FIG. 3C is a flow chart illustrating an audio training exercise of the air traffic voice interactive simulator of the present invention directed to tower communications.

This example illustrates the dialog between a user of the air traffic voice interactive simulator of the present invention during a simplified audio training exercise. With reference to FIG. 3C, the simplified audio training exercise 41c involves a simulated conversation between an aircraft pilot and an airport tower.

System: Noise burst.
Pilot: McCarran Tower (Initiation incorrect)
Air Traffic (ATC): Aircraft calling McCarran Tower, go ahead. (Initiation incorrect, go back to noise burst)
Pilot: McCarran Tower Cessna nine one one zero echo (or) McCarran Tower Cessna niner one one zero echo (Initiation correct)
ATC: Cessna one zero echo, say request.
Pilot (option 1): Ready for takeoff runway 25 right. (Runway correctly stated))
If runway correctly stated
ATC: Cessna one zero echo, Runway 25 Right, taxi into position and hold.
Pilot (option 2): Ready for takeoff. (Runway not correctly mentioned)
If runway not stated
ATC: Cessna one zero echo, verify Runway 25 Right.
Pilot: One zero echo ready for takeoff runway 25 right. Then
ATC: Cessna one zero echo, Runway 25 Right, taxi into position and hold.
Pilot: One zero echo
ATC: Cessna one zero echo, cleared for takeoff. Wind 240 at 5.
Pilot: One zero echo rolling
ATC: Cessna one zero echo, contact Las Vegas Departure on one three three point niner five.
Pilot: One three three niner five for one zero echo. Good day.

Example II—Conversation with Departure Control

Figure 3D:
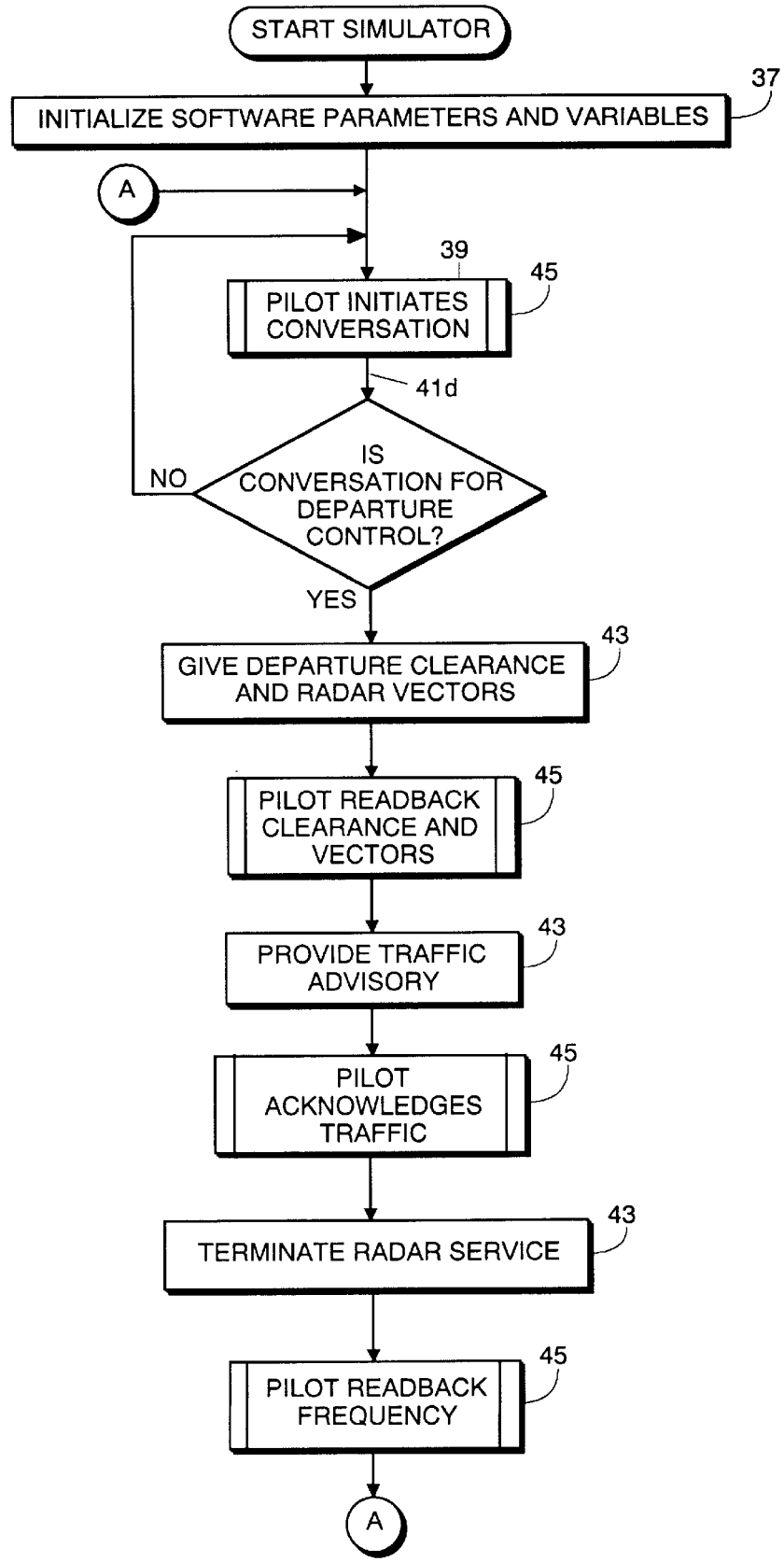
FIG. 3D is a flow chart illustrating an audio training exercise of the air traffic voice interactive simulator of the present invention directed to departure control.

With reference to FIG. 3D, this example illustrates the practice of the invention during an audio training exercise 41d simulating a conversation between an aircraft pilot and departure control.

System: Noise burst.
Pilot: Las Vegas Departure. (Initiation Incorrect).
ATC: Aircraft calling Las Vegas Departure, go ahead. (Initiation incorrect. Go back to noise burst.)
Pilot: Las Vegas Departure Cessna nine one one zero echo (or) Las Vegas Departure Cessna niner one one zero echo (Initiation correct)
ATC: Cessna one zero echo Las Vegas Departure go ahead.
Pilot (Option 1): With you at two thousand five hundred. (Altitude mentioned).
If altitude is not mentioned
ATC: Cessna one zero echo, say altitude.
Pilot: One zero echo at two thousand five hundred Then
ATC: Cessna one zero echo, traffic 2 o-clock, 4 miles, indicating four thousand five hundred.
Pilot: One zero echo looking. OR One zero echo traffic in site.
ATC: Cessna one zero echo, turn right heading zero one zero.
Pilot: Right turn heading zero one zero for one zero echo.
ATC: Cessna one zero echo, radar service terminated.
Pilot: One zero echo, good day.

For reasons of clarify the present invention, the foregoing examples have been substantially simplified. Preferably, the air traffic voice interactive system includes a vast library of different appropriate messages that may be chosen either at random, or depending on the user's skill level, to train user's in the proper terminology, procedures, protocol and customs required to communicate with air traffic controllers. Moreover, although particular forms of the invention have been illustrated and described, it will be apparent that various modifications can be made without departing from the spirit and scope of the invention. Accordingly, it is not intended that the invention be limited, except for the appended claims.

Having described the invention in such terms as to enable those skilled in the art to make and use it, and having identified the presently preferred best modes therof, I claim:

1. An air traffic voice interactive simulator for training pilots and trainees to verbally interact with air traffic controllers, said simulator comprising:

an audio input means for receiving verbal responses of a pilot or trainee;

an audio output means for audibly producing audio messages selected to simulate air traffic communication to a pilot or trainee;

a memory storage means for storing one or more audio training exercises, said audio training exercises including a plurality of audio messages with said audio messages constructed to provide instructions and questions to prompt verbal responses from a pilot or trainee so as to simulate air traffic communications with an air traffic controller; and a processor means connected to said audio input means, said audio output means and said memory means, said processor means provided for initiating said audio training exercises, said processor means further including:

voice interpretation means for interpreting verbal responses received by said audio input means;

evaluation means for evaluating verbal responses received by said audio input means; and selection means for selecting audio messages from said memory means in response to the evaluation of the verbal responses and for providing said selected audio messages to said audio output means for audio production to a pilot or trainee so as to simulate air traffic communications between a pilot or trainee and an air traffic controller.

2. The air traffic voice interactive simulator for training pilots and trainees of claim 1 further comprising:

a video display connected to said processor means.

3. The air traffic voice interactive simulator for training of pilots and trainees of claim 2 wherein:

said memory means further includes video display information for simulating the visual appearance of airplane flight; and said processor means further selectively displays said video display information on said video display.

4. The air traffic voice interactive simulator for training pilots and trainees of claim 1 further comprising a grading means for evaluating the verbal responses of a trainee or pilot to provide a numerical grade of the trainee or pilot's performance.

5. A method of training individuals to verbally communicate with air traffic controllers using an air traffic voice interactive simulator, the air traffic voice interactive simulator including an audio input means for receiving verbal responses of an individual, an audio output means for transmitting audio messages selected to simulate air traffic communication to an individual, a memory means for storing audio messages which simulate air traffic communications, a processor means connected to said audio input means, said audio output means and said memory means, said processor means provided for evaluating verbal responses received by said audio input means, for selecting audio messages from said memory means in response to the evaluation of the verbal responses, and for providing said selected audio messages to said audio output means, the method of individuals comprising the steps of:

providing a verbal response to the audio input means by an individual;

evaluating the audio response by the processor means;

selecting an audio message from the memory means in response to the evaluation of the audio response by the processor means;

providing the selected audio messages to the audio output means; and audibly producing the selected audio messages by the audio output means.

6. The method of claim 5 of training individuals to verbally interact with air traffic controllers using an air traffic voice interactive simulator further comprising the step of:

displaying video display information which simulates the visual appearance of airplane flight on a video display.

* * * * *